(12) United States Patent
Endres et al.

(10) Patent No.: US 8,506,743 B2
(45) Date of Patent: Aug. 13, 2013

(54) COMPOSITE SANDWICH STRUCTURE WITH INTEGRATED REINFORCEMENT AREA AND METHOD OF PRODUCING THE SAME

(75) Inventors: Gregor Christian Endres, Schweinfurt (DE); Hans-Juergen Weber, Verden (DE)

(73) Assignee: Airbus Deutschland GmbH, Hamburg (DE)

( * ) Notice: Subject to any disclaimer, the term of this patent is extended or adjusted under 35 U.S.C. 154(b) by 488 days.

(21) Appl. No.: 11/083,389

(22) Filed: Mar. 17, 2005

(65) Prior Publication Data

US 2005/0208274 A1 Sep. 22, 2005

Related U.S. Application Data

(60) Provisional application No. 60/600,068, filed on Aug. 9, 2004.

(30) Foreign Application Priority Data

Mar. 17, 2004 (DE) .......................... 10 2004 013 147

(51) Int. Cl.
| | |
|---|---|
| B29C 65/00 | (2006.01) |
| B31D 3/02 | (2006.01) |
| B32B 37/00 | (2006.01) |
| B32B 38/00 | (2006.01) |
| B32B 38/04 | (2006.01) |
| B32B 38/10 | (2006.01) |

(52) U.S. Cl.
USPC ........... 156/256; 156/196; 156/197; 156/250; 156/252; 156/253

(58) Field of Classification Search
None
See application file for complete search history.

(56) References Cited

U.S. PATENT DOCUMENTS

| | | | |
|---|---|---|---|
| 2,569,826 A | | 10/1951 | Packard |
| 2,576,530 A | | 11/1951 | Medal |
| 2,633,439 A | * | 3/1953 | Konstandt ..................... 428/116 |
| 2,963,128 A | | 12/1960 | Rapp |
| 3,305,996 A | * | 2/1967 | Shapiro ..................... 52/787.12 |
| 3,886,023 A | | 5/1975 | Deplante |
| 3,887,990 A | | 6/1975 | Wilson |

(Continued)

FOREIGN PATENT DOCUMENTS

| | | |
|---|---|---|
| DE | 2 316 061 | 10/1973 |
| DE | 89 15 724 | 5/1991 |

(Continued)

*Primary Examiner* — Mark A Osele
*Assistant Examiner* — Christopher C Caillouet
(74) *Attorney, Agent, or Firm* — W. F. Fasse

(57) ABSTRACT

Producing a local reinforcement in a core structure of a composite sandwich structure involves forming a hole in a cover layer and the core of the sandwich structure, forming a hollow space in the core with a diameter the same as or preferably larger than that of the hole, introducing a spatial bounding device through the hole into the hollow space, seating the spatial bounding device in the hollow space to contact outwardly against parts of the core preferably by outwardly expanding the device, and introducing a filler material into the spatial bounding device. A sandwich structure includes a core between cover layers, and a local reinforcement including a hole in at least one of the cover layers, a space in the core with a larger diameter than the hole, a spiral sleeve in the space, and a filler material inside the spiral sleeve.

19 Claims, 4 Drawing Sheets

(56) References Cited

U.S. PATENT DOCUMENTS

| | | | |
|---|---|---|---|
| 4,001,474 A * | 1/1977 | Hereth | 428/116 |
| 4,034,135 A | 7/1977 | Passmore | |
| 4,265,688 A | 5/1981 | Gorski | |
| 4,370,372 A * | 1/1983 | Higgins et al. | 428/116 |
| 4,778,637 A * | 10/1988 | Adams et al. | 264/136 |
| 4,787,186 A * | 11/1988 | Irmscher et al. | 52/309.3 |
| 5,316,828 A | 5/1994 | Miller | |
| 5,378,099 A * | 1/1995 | Gauron | 411/82.1 |
| 5,443,779 A * | 8/1995 | Ichikawa | 264/286 |
| 5,750,235 A | 5/1998 | Yoshimasa | |
| 6,187,123 B1 | 2/2001 | Chenier et al. | |
| 6,245,407 B1 | 6/2001 | Wang et al. | |
| 6,713,008 B1 | 3/2004 | Teeter | |
| 6,837,018 B1 * | 1/2005 | Hagel et al. | 52/698 |
| 6,837,659 B2 * | 1/2005 | Oberkofler | 411/82.1 |
| 2003/0087049 A1 | 5/2003 | Hachenberg et al. | |
| 2005/0204693 A1 | 9/2005 | Endres et al. | |
| 2005/0206035 A1 | 9/2005 | Endres et al. | |
| 2005/0208273 A1 | 9/2005 | Endres et al. | |

FOREIGN PATENT DOCUMENTS

| | | |
|---|---|---|
| DE | 43 21 316 | 1/1995 |
| DE | 297 12 684 | 11/1998 |
| DE | 101 46 201 | 4/2003 |
| DE | 101 54 063 | 5/2003 |
| EP | 0 264 870 | 4/1988 |
| EP | 0 273 515 | 9/1990 |
| EP | 0 589 054 | 3/1994 |
| JP | 06344449 | 12/1994 |

* cited by examiner

COMPOSITE SANDWICH STRUCTURE WITH INTEGRATED REINFORCEMENT AREA AND METHOD OF PRODUCING THE SAME

CROSS-REFERENCE TO RELATED APPLICATION

This U.S. Non-Provisional Application claims the benefit under 35 U.S.C. §119(e) of U.S. Provisional Application 60/600,068, filed on Aug. 9, 2004, the entire disclosure of which is incorporated herein by reference.

PRIORITY CLAIM

This application is based on and claims the priority under 35 U.S.C. §119 of German Patent Application 10 2004 013 147.3, filed on Mar. 17, 2004, the entire disclosure of which is incorporated herein by reference.

FIELD OF THE INVENTION

The invention relates to a method for providing reinforcement areas in composite sandwich structures with an open three-dimensional core structure between cover layers, and further relates to such a composite sandwich structure.

BACKGROUND INFORMATION

Due to their extraordinarily good ratio of stiffness or strength to density, core composites, i.e. composite sandwich structures having lightweight cores, have a broad range of application especially in the field of aircraft construction.

Well-known conventional core composites are generally formed of an upper and a lower cover layer or cover ply, between which is located, for example, a honeycomb-type core structure formed of vertically extending cells with a hexagonal cross section, for increasing the stiffness of the resulting composite sandwich structure.

For example metallic corrosion-protected aluminum foils, or non-metallic materials, such as Nomex®- or Kevlar®/N636-paper for example, are used for forming the core structure. Both the Nomex®-paper as well as the Kevlar®/N636-paper are coated with phenolic resin in a submersion process for increasing the mechanical strength thereof. Finally, the core structure is provided on both sides with cover layers, to form the finished or complete core composite.

A finished core having the above described true honeycomb structure can be readily provided with a local reinforcement area without problems. Due to the small-volume repeat units represented by the individual hexagonal honeycomb cells extending perpendicular to the cover layers, a stiffening or reinforcing material for forming a reinforcement area can be filled, pressed, foamed, poured or cast directly into a bored hole that passes through the core composite, and remains spatially confined within the cell or cells that is or are opened by the bored hole. The stiffening material may, for example, be a curable synthetic plastic material, for example a synthetic resin and/or synthetic plastic foam. In order to enable a connection of the core composite to other components, the core composite can then be bored in the reinforcement area. If necessary, by means of pertinent known methods, a securing element, for example an insert nut or some other insert, can also be introduced into the reinforcement area of the core composite.

In contrast to the above described true honeycomb-type core composites, in which a spatial limitation is always provided by the relatively small, individual cells extending perpendicular to the cover layers, new types of core composites, especially formed of three-dimensional folded comb or cell structures, comprise an open or drainable structure. Namely, such pleated or folded core structures include fold or pleat valleys that form open channels extending continuously in the plane of the composite structure, i.e. along or parallel to the cover layers from edge-to-edge of the composite structure. Thus, the core channels of such a core composite extend open and unobstructed through large areas (or even along the entire length or width) of the finished composite sandwich. Thereby, for example, it is possible to guide various types of lines (e.g. electrical lines, hydraulic lines, water lines, air lines, etc.) through the core composite without previously having to cut or machine a passage therethrough while impairing the mechanical properties of the core composite.

If, in order to form reinforcement areas in the above described complete core composites with drainable core structures, a pasty or viscous hardening material is introduced, for example, into a bored hole passing through the core composite, the material can thus, depending on its viscosity, more or less uncontrolledly spread out laterally through the open channel or channels of the core structure. Namely, viscous or pasty substances can spread-out uncontrollably over larger distances in open drainable core structures, in contrast to true honeycomb structures, in which fundamentally only a limited number of structural units is opened by a bored hole and thus introduced substances are always spatially limited.

Therefore the standard reinforcement methods according to the state of the art are not usable without further measures for producing reinforcement areas within complete core composites having an open drainable core structure between two cover layers.

SUMMARY OF THE INVENTION

It is an object of the invention to provide a method for forming reinforcement areas in complete core composites already provided on both sides with cover layers and having an open core structure, especially a three-dimensional folded comb structure. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a method of producing a local reinforcement area in a core structure of a composite sandwich structure. The method involves forming a hole in a cover layer and the core of the sandwich structure, forming a hollow space in the core with a diameter equal to or preferably larger than that of the hole, introducing a spatial bounding device through the hole into the hollow space, seating the spatial bounding device in the hollow space to contact outwardly against parts of the core preferably by outwardly expanding the device, and introducing a filler material into the spatial bounding device.

The above objects have further been achieved according to the invention in a composite sandwich structure comprising a core structure including a folded core element having fold valleys forming open channels extending longitudinally therealong, cover layers applied on opposite sides of the core structure, and a local reinforcement area. The reinforcement area includes a hole in at least one cover layer, a space in the core having a diameter larger than that of the hole, a spiral sleeve arranged in the space and secured to the core structure with an outer surface of the spiral sleeve in contact with the core structure, and a filler material in an interior of the spiral sleeve.

Because at least one reinforcement area is formed in the area of the core structure of the finished or complete core composite, forces can be introduced into the core composite via the reinforcement area, and recesses or openings and especially bored holes can be formed (e.g. as mounting points) in the reinforcement area. Furthermore the invention allows the integration of securing elements during or after the fabrication of the reinforcement areas.

The inventive method enables the simple and rapid production of local reinforcement areas within finished or complete core composites already provided with cover layers, whereby these core composites have an open core structure, especially a three-dimensional folded comb structure.

Further developments and advantageous embodiments of the invention are set forth in further patent claims. Further advantages arise from the following detailed description of the invention.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
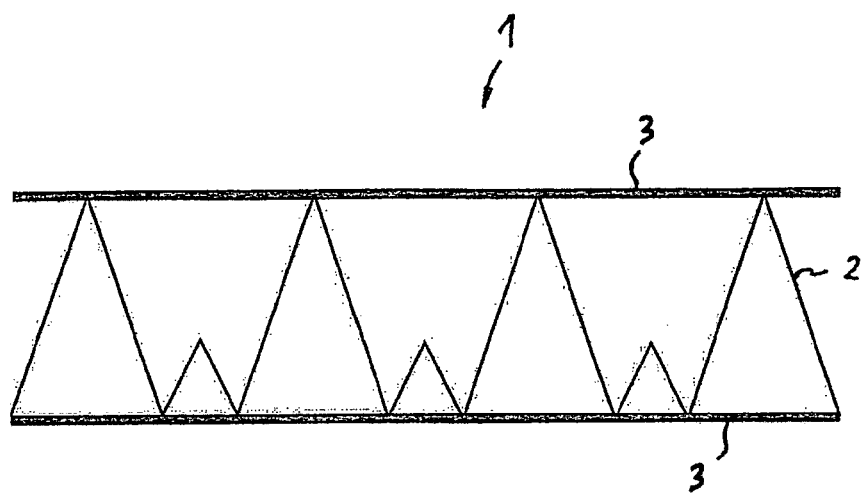
FIG. 1 is a sectional view of a finished core composite with an open three-dimensional core structure with cover layers applied on both sides.

FIG. 1 shows a finished or complete core composite 1 with a schematically illustrated core structure 2 and cover layers 3 applied on both sides. The core structure 2 is embodied as an open three-dimensional folded comb structure and is rigidly or fixedly connected with the cover layers 3 for the formation of the finished or complete core composite 1.

Figure 2:
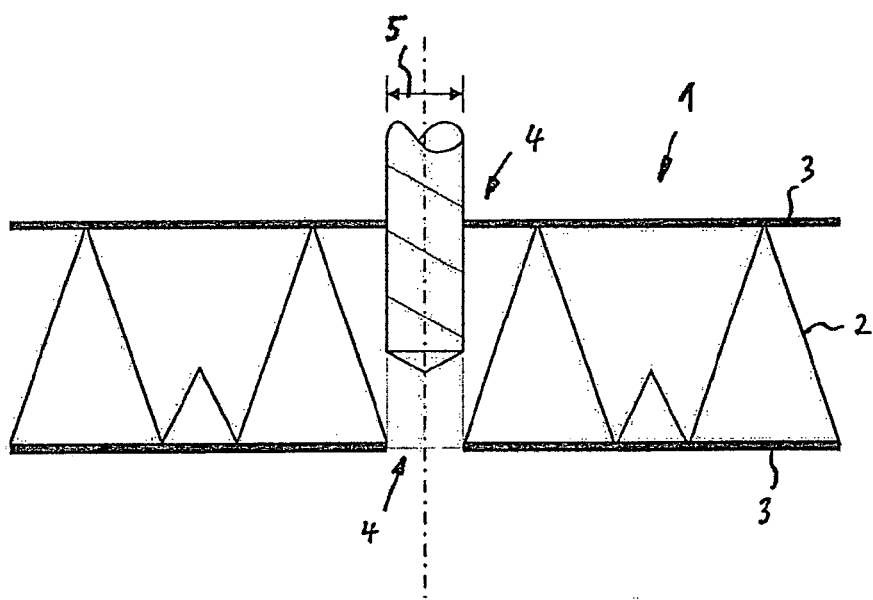
FIG. 2 is a sectional view of the core composite with a bored hole that is introduced in a first method step.

The introduction of a bored hole 4 with a bored hole diameter 5 into the core composite 1 in a first method step is illustrated in FIG. 2. In this regard, the bored hole 4 passes through the entire core composite 1, including the cover layers 3 as well as the core structure 2. If only one reinforcement area is to be produced, or for example a blind hole is to be introduced into the reinforcement area, then a one-sided bored hole 4 is sufficient.

Figure 3:
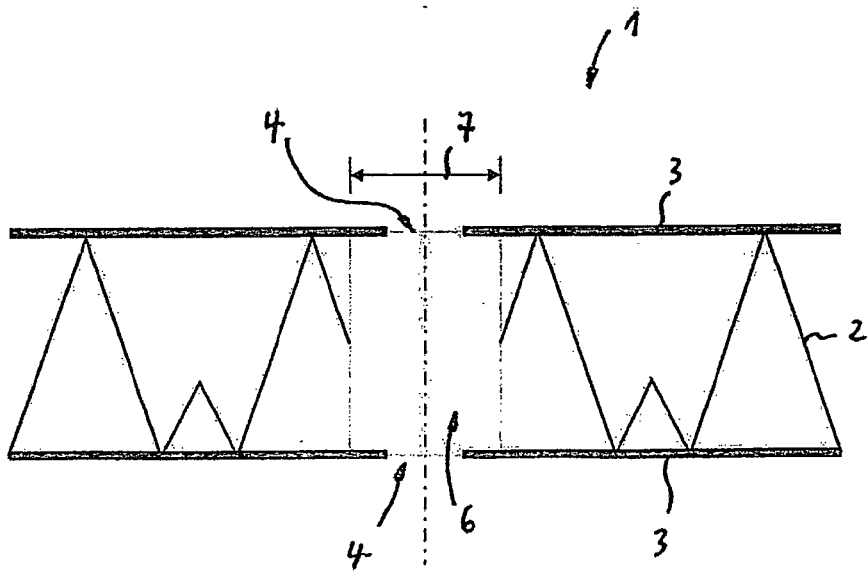
FIG. 3 is a sectional view of the core composite with a hollow space that is formed in a second method step.

FIG. 3 illustrates, schematically and not according to scale, the introduction of a hollow space 6 into the finished or complete core composite 1 with a specialized tool, for example a specialized undercutting milling tool or undercutting reamer, which is not shown but can have any suitable configuration and operation to form an enlarged or undercut hollow space, for example as understood conventionally. Basically, forming the hollow space 6 involves cutting and milling away the material of the core, for example the core pleat webs, in the pertinent area, while leaving cut ends of the core pleat webs around the perimeter of the hollow space. The hollow space 6 is preferably embodied cylindrically, but can alternatively have a non-cylindrical shape. For forming the hollow space 6, the special milling tool is introduced into the bored hole 4, and the core structure 2 is opened or enlarged so far until a diameter 7 of the hollow space 6 has reached approximately the 1.0-fold to 20.0-fold multiple of the bored hole diameter 5 of the bored hole 4. Preferably the hollow space diameter 7 is larger than the hole diameter 5, or especially at least twice as large, or even in the range from 3 to 20 times the size of the hole diameter 5. The bored hole diameter 5 in the cover layers 3 remains unaffected thereby, i.e. the hole diameter 5 is maintained without change.

Figure 4:
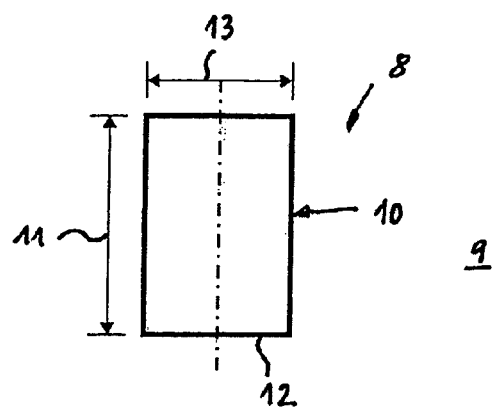
FIG. 4 is a side view of a spiral sleeve as a limiting or bounding element for forming a spatial limitation or boundary of a reinforcement area inside the core composite, in a partially relaxed or stress-released condition.
Figure 5:
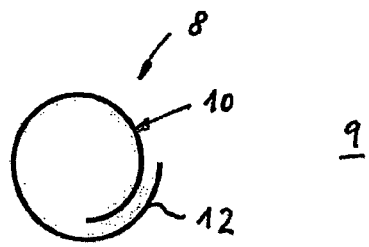
FIG. 5 is a cross-sectional view of the spiral sleeve in the partially stress-released condition.

FIGS. 4 and 5 show a spiral sleeve 8 as a possible limiting or bounding means for the formation of a reinforcement area within the core composite in a partially relaxed or stress-released condition 9, in a side view and in a cross-sectional view. Also other devices of which the cross-sectional geometry is variable in a targeted or intended manner, for example such as inflatable hollow bodies or hollow bodies made of shape memory alloy metals, etc., can alternatively be used as limiting or bounding means. For example, by heating a hollow body made of a shape memory alloy to a prescribed trigger temperature, the alloy will return (e.g. expand) to its previous (larger) size and shape after it has been inserted into the hollow space 6.

The spiral sleeve 8 comprises an approximately cylindrical outer geometry with a shell surface 10 and a height 11 that corresponds approximately to the height of the core structure 2. The spiral sleeve 8 is formed of an initially planar spring-elastic material strip 12, for example of a synthetic plastic material, which is thereafter rolled-up. Thus it can be understood that the circular ends of the cylindrical shell of the sleeve are open, as also shown in the drawings. In the partially relaxed or stress-released condition 9, the spiral sleeve 8 comprises a diameter 13 that corresponds approximately to the diameter 7 of the hollow space 6. In the completely relaxed or stress-released condition of the spiral sleeve 8 outside of the core composite 1, the diameter thereof is larger than or equal to the diameter 7 of the hollow space 6, or the material strip 12 may even return entirely back to its flat planar condition if unconstrained.

Figure 6:
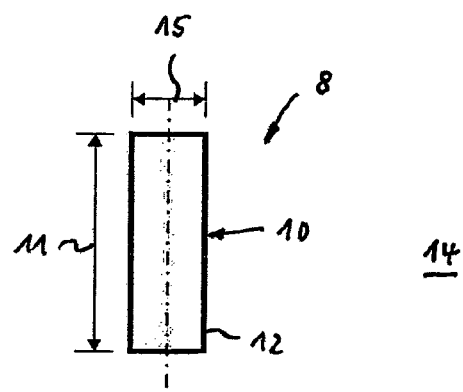
FIG. 6 is a side view of the spiral sleeve in a contracted stressed condition.
Figure 7:
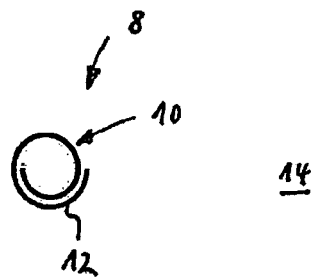
FIG. 7 is a cross-sectional view of the spiral sleeve in the contracted stressed condition.

The spiral sleeve 8 is shown in a stressed condition 14, respectively in a side view and a cross-sectional view, in FIGS. 6 and 7. The stressed condition 14 can be achieved, for example, through tightly rolling-up the spiral sleeve 8, comparable with the winding or tensioning of a spiral spring. In the stressed condition 14, the spiral sleeve 8 has a smaller diameter 15, which approximately corresponds to the bored hole diameter 5, so that the spiral sleeve 8 can be inserted through the bored hole 4 into the hollow space 6. Hereby, the height 11 of the spiral sleeve 8 remains unchanged.

Figure 10:
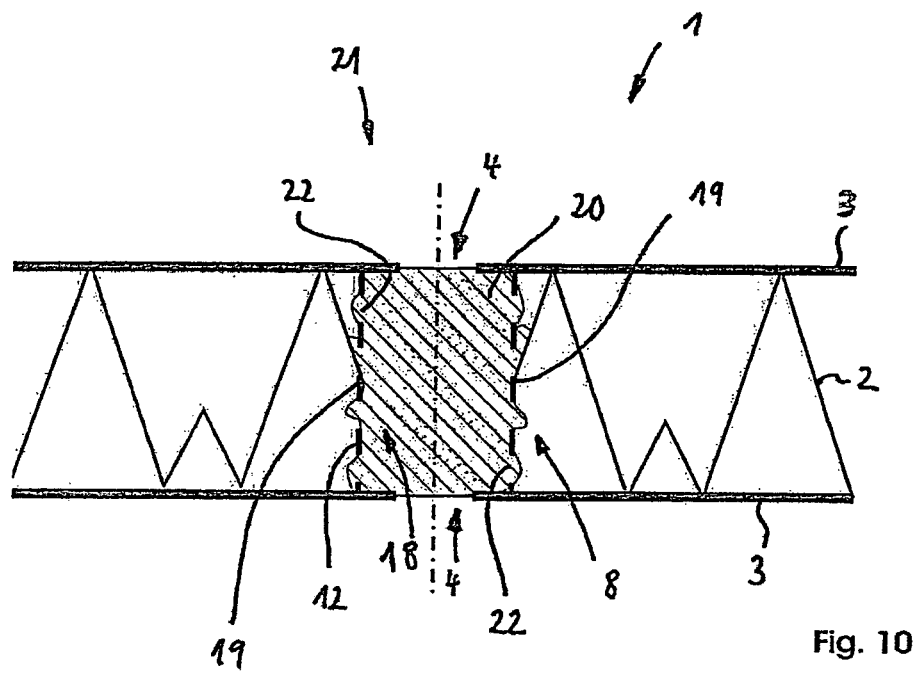
FIG. 10 is a sectional view showing the filling of the spatial limitation or boundary formed by a special embodiment of a spiral sleeve (having openings) with a filler material to form a reinforcement area in a fifth method step.
Figure 11:
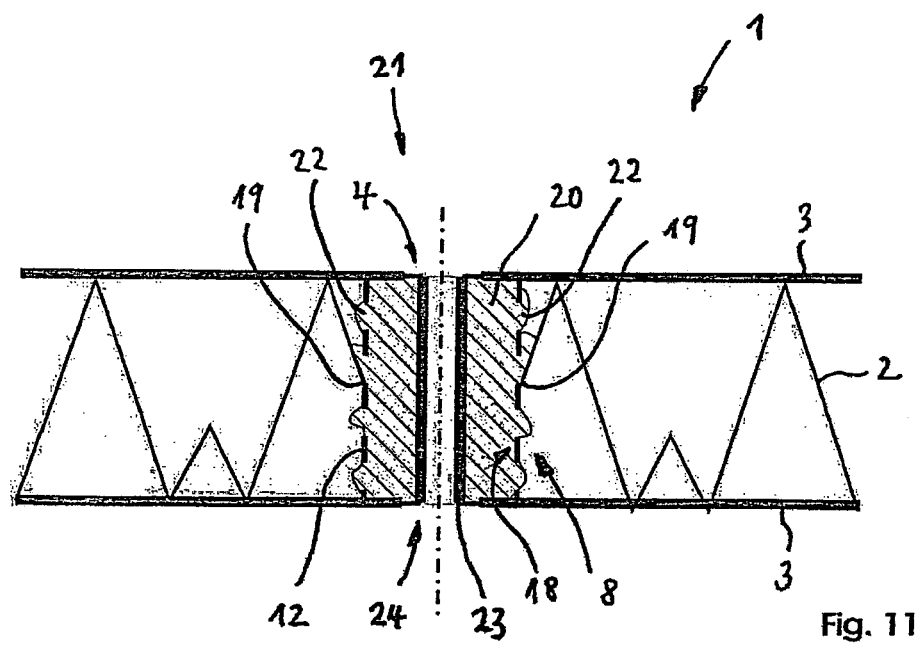
FIG. 11 is a sectional view showing the integration of a securing element in the reinforcement area in an optional further method step.

The material strip 12 can at least area-wise (i.e. in certain areas) be provided with recesses or openings and thereby be embodied permeable at least area-wise, see the illustration of the spiral sleeve 8 in FIGS. 10 and 11. As will be explained below, the openings serve to permit a limited discharge of a filler material out of an interior of the spiral sleeve and into the surrounding core structure, to fix the spiral sleeve in the core structure. For this purpose, small recesses or openings, especially small bored holes, etc., preferably arranged distributed uniformly over the shell surface 10, can be introduced into the material strip 12 forming the spiral sleeve 8. In an alternative variant of the method, the material strip 12 can be formed of a perforate material with a net, mesh, gauze or woven web structure.

Furthermore, a carbon fiber or fiberglass woven web can be used to form the material strip 12, which is thereafter coated and/or impregnated with a synthetic plastic material, whereby at least area-wise openings remain open and through-going in the material strip 12. By means of the carbon fiber or fiberglass web armoring, the spring characteristics of the material strip 12 impregnated or formed with a synthetic plastic material are improved.

Furthermore, as an alternative, or additionally, it is possible to provide the shell surface 10 of the spiral sleeve 8 at least area-wise with an adhesive layer, which will serve to bond the spiral sleeve to the core structure. In this case it is not necessary for the material strip 12 to comprise recesses or openings. In this regard, the adhesive layer must be applied in such a manner that the expansion of the spiral sleeve 8 from the stressed condition 14 into the partially relaxed or stress-released condition 9 is not hindered by the adhesive layer.

As a further alternative, the material strip 12 can consist of a material that softens in a defined manner under the influence of a prescribed temperature. Finally, the material strip 12 can be formed with a material that autonomously foams-up under certain conditions. Also in the two last-mentioned cases, it is not necessary to provide recesses or openings in the material strip 12, because the features described here will serve to bond the spiral sleeve to the core structure.

Figure 8:
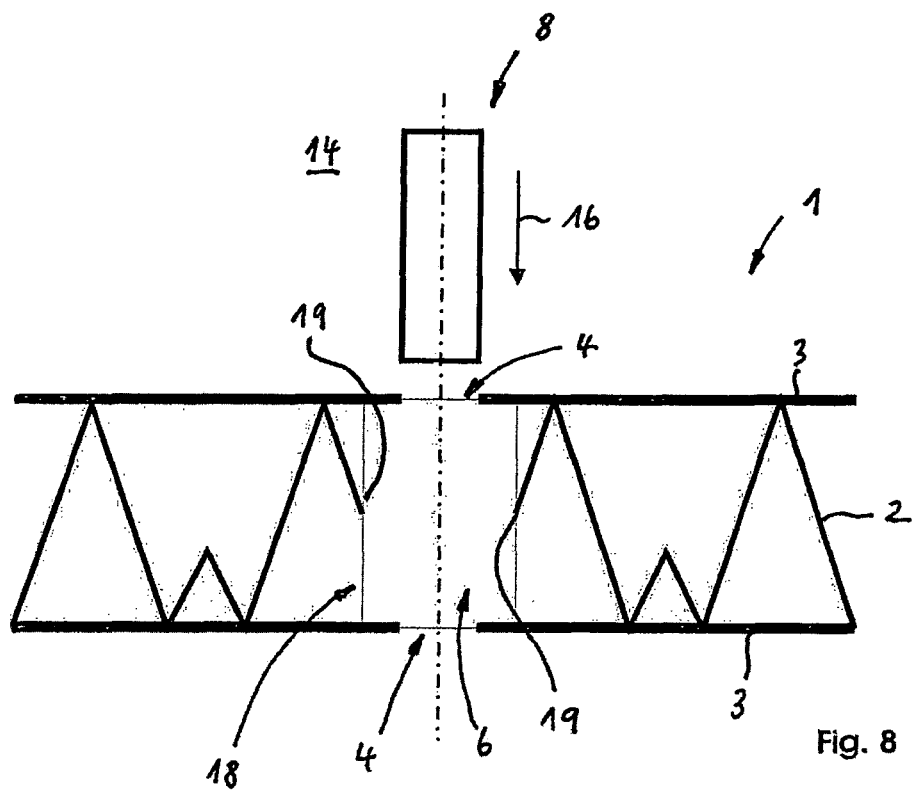
FIG. 8 is a sectional view of the core composite after the step of FIG. 3, showing the introduction of the spiral sleeve in the stressed condition into the core composite in a third method step.
Figure 9:
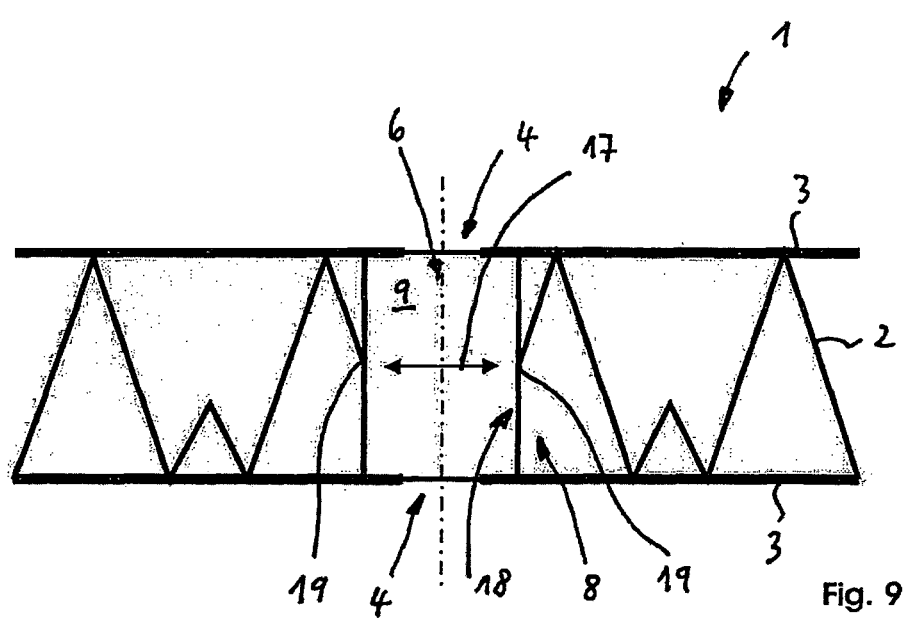
FIG. 9 is a sectional view of the core composite following the step of FIG. 8, showing the spiral sleeve in the partially relaxed or stress-released condition in a fourth method step.

FIGS. 8 and 9 illustrate the introduction of a spiral sleeve 8 without recesses or openings into the hollow space 6 in the interior of the core composite 1. First the spiral sleeve 8 in the stressed condition 14 is pushed or slid through the bored hole 4 into the core structure 2 as indicated by the arrow 16, where it then automatically or autonomously, due to its spring elasticity, expands into the partially relaxed or stress-released condition 9 as indicated by an arrow 17, to form a spatial limitation or boundary 18. In this regard, due to the spring elasticity of the spiral sleeve 8, the shell surface 10 of the spiral sleeve 8 lies outwardly at least partially or section-wise in contact on free webs 19 of the core structure 2 at the perimeter of the hollow space 6. Additionally, the spiral sleeve 8 is prevented from falling out of the bored hole 4 or the core composite 1 by the cover layers 3 partially covering the hollow space 6.

A spatial limitation or boundary 18 is formed in the interior of the core composite 1 by the spiral sleeve 8, into which a filler material 20, for example a synthetic plastic material, especially a curable synthetic resin and/or a curable synthetic plastic foam, can be introduced for the formation of a reinforcement area 21 as indicated in FIG. 10.

If the spiral sleeve 8 is formed, for example, with a material strip 12 comprising at least area-wise recesses or openings 22, as already explained above in the context of the description of FIGS. 4 to 7, the filler material 20 can flow in a controlled and thus limited extent out through the openings 22 into the core structure 2 outside of the spatial limitation or boundary 18, whereby a force-transmitting connection of the webs 19 of the core structure 2 onto the spiral sleeve 8 and/or the filler material 20 cured therein is achieved. Thereby a force-transmission from the reinforcement area 21 to the core structure 2 with the cover layers 3, and thus to the entire core composite 1, is made possible.

The same effect is achievable if the shell surface 10 of the spiral sleeve 8 is at least area-wise provided with an adhesive layer that bonds the sleeve 8 to the core webs 19. Furthermore it is possible to form the spiral sleeve 8 with a material that softens at a certain temperature and thus, when heated to at least this temperature, achieves a force-transmitting connection of the spiral sleeve 8 onto the webs 19 of the core structure 2 and thus to the entire core composite 1 because the webs 19 penetrate and engage into the softened material of the spiral sleeve 8. Moreover, the spiral sleeve 8 can alternatively be formed with a material that foams-up after the insertion into the hollow space 6, which similarly achieves a connection of the spiral sleeve 8 onto the webs 19 of the core structure 1. In the three last-mentioned variants it is not absolutely necessary to provide recesses or openings 22 in the spiral sleeve 8 or the material strip 12 forming the sleeve.

FIG. 11 illustrates the optional integration of a securing element 23 into the reinforcement area 21. The securing element 23 may, for example, be an insert nut or some other insert element. Further variants of securing elements 23 are also suitable in this context. For the integration of the securing element 23, first a bored securing hole 24 is introduced into the filler material 20 forming the reinforcement area 21. Thereafter the securing element 23 is positioned by known methods in the bored securing hole 24 and is secured therein in a force-transmitting manner, for example by being glued-in. Beginning from the securing element 23, forces can be transmitted through the filler material 20, the spiral sleeve 8 as well as the webs 19 connected thereto, to the core composite formed of the core structure 2 with cover layers 3 on both sides.

Alternatively, the securing element 23 can be inserted before the filling of the spiral sleeve 8 with the filler material 20, so as to be embedded or potted in the filler material.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of producing a local reinforcement area in a core structure of a composite sandwich structure, comprising:
   a) providing a composite sandwich structure including an open three-dimensional core structure and first and second cover layers applied on opposite first and second sides of said core structure, wherein said core structure comprises a folded core element having fold valleys forming open channels that are bounded between said folded core element and said first and second cover layers and that extend in a longitudinal direction of said open channels continuously along and parallel to said first and second cover layers;

b) forming a hole having a hole diameter in at least said first cover layer and in said core structure;

c) forming a hollow space having a hollow space diameter in said core structure, wherein said hollow space diameter is at least twice as large as said hole diameter, said hollow space is bounded at least partially by bounding parts of said core structure at a perimeter of said hollow space, said hollow space communicates into an adjoining open channel of said open channels, and said bounding parts of said core structure at said perimeter of said hollow space are cut edges of webs of said folded core element that were cut during said forming of said hollow space;

d) introducing a spatial boundary device comprising a spiral sleeve through said hole in said first cover layer into said hollow space in said core structure, wherein at least a partial area of said spiral sleeve is a material strip of a perforated sheet, a net, a mesh, or a woven web that has a regular pattern of openings passing therethrough;

e) outwardly expanding and seating said spiral sleeve in said hollow space so that said spiral sleeve at least partially contacts outwardly against said bounding parts of said core structure;

f) introducing a filler material into a bounded space formed within said spiral sleeve, wherein said openings serve to permit a limited discharge of said filler material out of said bounded space and into said adjoining open channel to fix said spiral sleeve in said core structure, and then hardening said filler material so as to form thereof a local reinforcement area, and g) integrating a securing element into said local reinforcement area after the formation of said local reinforcement area.

2. The method according to claim 1, wherein said hollow space diameter is from 3 to 20 times said hole diameter.

3. The method according to claim 1, wherein said hole diameter of said hole in said first cover layer established in said step b) is maintained unchanged throughout said steps c), d), e), and f).

4. The method according to claim 1, wherein said step c) of forming said hollow space comprises enlarging said hole in said core structure using an undercutting miller or an undercutting reamer reaching through said hole in said first cover layer.

5. The method according to claim 1, wherein said spiral sleeve has variable cross section geometry, wherein said step d) is carried out with a spiral sleeve outer diameter of said spiral sleeve contracted to be smaller than or equal to said hole diameter, and wherein said step e) involves expanding said spiral sleeve outer diameter to be equal to said hollow space diameter.

6. The method according to claim 5, wherein said spiral sleeve comprises a shape memory alloy metal, and said step e) comprises heating said hollow body to cause said shape memory alloy metal to expand.

7. The method according to claim 5, wherein said spiral sleeve has, in an unstressed condition, said outer diameter being larger than said hole diameter and at least as large as said hollow space diameter, said step d) involves compressing said spiral sleeve to a stressed contracted condition in which said outer diameter is smaller than or equal to said hole diameter, and said step e) involves allowing said spiral sleeve to expand out of said stressed contracted condition until said outer diameter equals said hollow space diameter.

8. The method according to claim 1, wherein said step d) involves contracting said spiral sleeve to a stressed condition and then passing said spiral sleeve through said hole in said first cover layer while said spiral sleeve is in said stressed condition, and said step e) involves expanding said spiral sleeve to an expanded condition in which said spiral sleeve is at least partially destressed relative to said stressed condition and in which said spiral sleeve contacts outwardly against said bounding parts of said core structure.

9. The method according to claim 1, wherein said spiral sleeve achieves a stressed condition through tightly rolling said spiral sleeve, and in said stressed condition said spiral sleeve has a smaller diameter compared to a relaxed condition of said spiral sleeve.

10. The method according to claim 9, wherein said spiral sleeve has a height corresponding to a thickness of said core structure between said cover layers.

11. The method according to claim 9, wherein said spiral sleeve comprises an initially planar spring-elastic material strip of a synthetic plastic material.

12. The method according to claim 9, wherein said spiral sleeve comprises a material that softens at a specified temperature, and said step e) further comprises heating said spiral sleeve to at least said specified temperature so as to soften said material and to thereby connect said spiral sleeve to said core structure by said material.

13. The method according to claim 9, wherein said spiral sleeve comprises a material that foams-up under a specified condition, and said step e) further comprises subjecting said spiral sleeve to said specified condition so as to cause said material to foam-up and to thereby connect said spiral sleeve to said core structure by said material.

14. The method according to claim 1, wherein the securing element comprises an insert element.

15. The method according to claim 14, wherein said insert element is an insert nut.

16. The method according to claim 1, further comprising boring a bored hole into said filler material of said local reinforcement, wherein a securing element is positioned in the bored hole and is secured therein in a force-transmitting manner.

17. The method according to claim 1, wherein a sleeve wall of said spiral sleeve comprises a woven web mesh of carbon fibers and/or fiberglass fibers that are coated and/or impregnated with a synthetic plastic material so as to leave said openings open through said woven web mesh, permitting a limited discharge of said filler material out of an interior of the spiral sleeve into the surrounding core structure, and fixing the spiral sleeve in the core structure.

18. The method according to claim 1, wherein said open channels extend continuously open in said longitudinal direction of said channels from one edge to an opposite other edge of said core structure.

19. The method according to claim 1, wherein said filler material introduced in said step f) is a flowable filler material, wherein said local reinforcement area formed in said step f) comprises said spiral sleeve and said filler material hardened inside and outside of said spiral sleeve, whereby said hardened filler material outside of said spiral sleeve fixes said spiral sleeve to said core structure, and wherein said step g) comprises boring a hole into said hardened filler material inside of said spiral sleeve and inserting and fixing said securing element into said bored hole.

* * * * *